United States Patent
Arai et al.

(10) Patent No.: US 10,125,207 B2
(45) Date of Patent: Nov. 13, 2018

(54) CROSS-COPOLYMER, AND RESIN COMPOSITION

(71) Applicant: Denka Company Limited, Chuo-ku, Tokyo (JP)

(72) Inventors: Toru Arai, Machida (JP); Tometomo Uchida, Machida (JP); Ayumu Tsukamoto, Machida (JP)

(73) Assignee: Denka Company Limited, Tokyo (JP)

( * ) Notice: Subject to any disclaimer, the term of this patent is extended or adjusted under 35 U.S.C. 154(b) by 127 days.

(21) Appl. No.: 15/301,247

(22) PCT Filed: Apr. 1, 2015

(86) PCT No.: PCT/JP2015/060400
§ 371 (c)(1),
(2) Date: Oct. 27, 2016

(87) PCT Pub. No.: WO2015/152343
PCT Pub. Date: Oct. 8, 2015

(65) Prior Publication Data
US 2017/0037174 A1    Feb. 9, 2017

(30) Foreign Application Priority Data

Apr. 3, 2014  (JP) ................. 2014-077229
Feb. 18, 2015  (JP) ................. 2015-029582

(51) Int. Cl.
| | |
|---|---|
| C08F 255/02 | (2006.01) |
| C08F 210/16 | (2006.01) |
| C08F 4/6592 | (2006.01) |
| C08F 297/02 | (2006.01) |
| C08L 25/06 | (2006.01) |
| C08F 4/659 | (2006.01) |
| C08L 53/00 | (2006.01) |

(52) U.S. Cl.
CPC .......... *C08F 255/02* (2013.01); *C08F 4/6592* (2013.01); *C08F 210/16* (2013.01); *C08F 297/02* (2013.01); *C08L 25/06* (2013.01); *C08F 4/65912* (2013.01); *C08L 53/00* (2013.01); *C08L 2205/03* (2013.01); *C08L 2205/06* (2013.01); *C08L 2205/08* (2013.01)

(58) Field of Classification Search
CPC . C08F 295/00; C08F 290/044; C08F 290/124
See application file for complete search history.

(56) References Cited

U.S. PATENT DOCUMENTS

| | | |
|---|---|---|
| 6,096,849 A | 8/2000 | Chung et al. |
| 6,100,331 A | 8/2000 | Teshima |
| 6,265,493 B1 | 7/2001 | Chung et al. |
| 6,376,614 B1 | 4/2002 | Teshima et al. |
| 6,414,102 B2 | 7/2002 | Chung et al. |
| 6,559,234 B1 | 5/2003 | Arai et al. |
| 6,566,453 B1 | 5/2003 | Arai et al. |
| 2001/0025085 A1* | 9/2001 | Teshima ................ C08F 290/04 525/315 |
| 2001/0047069 A1 | 11/2001 | Chung et al. |
| 2002/0115802 A1 | 8/2002 | Teshima et al. |
| 2002/0161130 A1 | 10/2002 | Arai et al. |
| 2004/0147681 A1 | 7/2004 | Arai et al. |
| 2007/0225428 A1* | 9/2007 | Bening ..................... C08F 8/04 524/505 |
| 2013/0337258 A1* | 12/2013 | Schwendeman ........ E04D 5/10 428/327 |

FOREIGN PATENT DOCUMENTS

| | | |
|---|---|---|
| JP | 10-292076 A | 11/1998 |
| JP | 11-124420 A | 5/1999 |
| JP | 2009-167387 A | 7/2009 |
| JP | 2010-043246 A | 2/2010 |
| WO | 00/037517 A1 | 6/2000 |
| WO | 2007/139116 A1 | 12/2007 |

OTHER PUBLICATIONS

Masaru et al., electronic translation of JP 2009-167387 (Jul. 2009).*
International Search Report dated Jul. 7, 2015, issued in corresponding International Application No. PCT/JP2015/060400, filed Apr. 1, 2015, 2 pages.

* cited by examiner

*Primary Examiner* — Jeffrey C Mullis
(74) *Attorney, Agent, or Firm* — Christensen O'Connor Johnson Kindness PLLC

(57) ABSTRACT

The present invention addresses the problem of providing a cross-copolymer having excellent flexibility, heat resistance, cold resistance and mechanical properties. The present invention also addresses the problem of providing a resin composition which is prepared using the cross-copolymer, has excellent compatibility with polyolefin resins and aromatic resins, and has excellent flexibility, heat resistance and cold resistance.
The problem can be solved by a cross-copolymer produced by a polymerization process comprising a coordination polymerization step and a crossing step, wherein the coordination polymerization step comprises copolymerizing an ethylene monomer, a specific olefin monomer and an aromatic polyene together using a single site coordination polymerization catalyst to synthesize an ethylene-olefin-aromatic polyene copolymer that meets a specific requirement, and the crossing step comprises carrying out a polymerization in the co-presence of the ethylene-olefin-aromatic polyene copolymer and an aromatic vinyl compound monomer using an anionic polymerization initiator or a radical polymerization initiator.

17 Claims, 2 Drawing Sheets

CROSS-COPOLYMER, AND RESIN COMPOSITION

TECHNICAL FIELD

The present invention relates to a cross-copolymer having excellent flexibility, heat resistance, cold resistance, and mechanical properties. The present invention further relates to a resin composition which is prepared using the cross-copolymer, has excellent compatibility with polyolefin resins and aromatic resins, and has excellent flexibility, cold resistance, and heat resistance.

BACKGROUND ART

<Novel Thermoplastic Elastomers>

Various kinds of flexible thermoplastic elastomer (hereinafter, referred to as TPE) have been used for various applications. However, it is generally difficult to have both flexibility and heat resistance. In the case of an olefin-based random copolymer, as its flexibility increases, the crystallinity decreases. In the case of a TPE with a JIS-A hardness of about 50 to 80 (e.g., an ethylene-α-olefin copolymer and an ethylene-vinyl acetate copolymer), its heat-resistant temperature for practical purposes equals its melting point, which ranges from about 50 to 80° C. In the case of a plasticizer-plasticized vinyl chloride resin (flexible vinyl chloride), evaporation of the plasticizer causes curing under high temperatures. Because of the above, a resin composition (compound) containing polypropylene and a hydrogenated block copolymer having excellent flexibility and heat resistance has been usually used. The hydrogenated block copolymer is suitable for the above applications because of its relative flexibility and excellent heat resistance as well as excellent compatibility with polypropylene-based resins that impart additional heat resistance.

<Compatibility Accelerators, Modifiers, and Adhesives>

Polyolefin resins such as polypropylene and polyethylene have been used for various applications because they are inexpensive, their molding process is easy, and their mechanical properties are good. Their physical properties may be modified. For example, impact resistance and/or flexibility may be imparted; compatibility with aromatic resins such as polystyrene-based resins may be enhanced; and they may adhere to a different type of resin. For these purposes, various modifiers, compatibility accelerators, and/or adhesives have been used. Hydrogenated block copolymers have been frequently used as modifiers, compatibility accelerators, and adhesives for polyolefin.

<Hydrogenated Block Copolymers>

These hydrogenated block copolymers are produced, using styrene and a diene (e.g., butadiene, isoprene) as source materials, by carrying out an anionic living polymerization, followed by a hydrogenation process. In this connection, however, butadiene and isoprene, which are source materials for the above hydrogenated block copolymers, are basically expensive. As motorization proceeds in East Asia, a demand for solution-polymerized SBR for tires increases. Meanwhile, one of the diene sources is a naphtha cracker. Then, production shift to Middle East has occurred and an ethane cracker has been used increasingly. Thus, the number of naphtha cracker facilities in East Asia tends to decrease. Even in U.S., shale gas-derived ethane has replaced naphtha as a cracker source material. If the worldwide supply of shale gas starts, ethylene may be supplied using an ethane cracker. Under such circumstances (i.e., an increased supply of ethylene produced from an ethane cracker and a decreased supply of ethylene produced from naphtha), propylene can be industrially manufactured by metathesis of ethylene and butene (synthesized by ethylene dimerization). Meanwhile, it has been proposed that butadiene should be produced using a process comprising: synthesizing 1-butene by ethylene dimerization; and then performing a dehydrogenation reaction. However, the dehydrogenation step is difficult and expensive when compared with the case of butadiene produced from a naphtha cracker. In addition, a supplier of isoprene is limited and isoprene is more expensive than butadiene. Further, a polybutadiene chain and/or a polyisoprene chain contain a double bond. Accordingly, they lack durability and heat resistance as they are. Consequently, they should be subject to hydrogenation. This is why the above step is costly.

A hydrogenated diene chain, which is a soft segment of the above hydrogenated block copolymer, is a copolymer chain including ethylene and an α-olefin (propylene or 1-butene). From a different view point, the hydrogenated diene chain can be seen as a non-crystalline, flexible copolymer chain including ethylene and an α-olefin. Here, an analogous block copolymer has been tried to be produced directly by a living polymerization using ethylene, an α-olefin, and a styrene monomer without using a diene. This process, however, is technically difficult. Besides, the living polymerization only yields one polymer molecule per catalyst. Thus, the cost of a single site coordination polymerization catalyst (initiator), a complex transition metal compound, is significantly high, so that it is impractical to use the catalyst.

This has stimulated research in which a single site coordination polymerization catalyst having high olefin polymerization activity is used to produce a block copolymer by a non-living process. For example, cross-copolymer production technologies have been disclosed (Patent Literatures 1, 2, and 3). First, a single site coordination polymerization catalyst is used to synthesize a divinylbenzene-containing olefin-based copolymer. Next, a vinyl compound such as styrene is polymerized under the co-presence of this copolymer. Then, divinylbenzene units of the copolymer are copolymerized to produce a cross-copolymer containing, in its molecular structure, both block chains: a polyolefin chain and a vinyl compound polymer chain. A divinylbenzene-containing olefin-based copolymer has been preferably used for a cross-copolymer. A relatively small amount of divinylbenzene units is included in the divinylbenzene-containing olefin-based copolymer. The amount of cross-linking of the units should be as small as possible to give a sufficient amount of pendant vinyl groups. Also, the divinylbenzene-containing olefin-based copolymer, as a soft segment, should have a sufficient molecular weight. A copolymer containing a small amount of divinylbenzene in a copolymer chain including ethylene and an α-olefin, which chain is similar to a hydrogenated diene chain, is suitable for the present invention. Patent Literature 4 describes a process for efficiently producing the copolymer and a catalyst therefor.

CITATION LIST

Patent Literature

[Patent Literature 1] WO00/037517
[Patent Literature 2] WO2007139116
[Patent Literature 3] U.S. Pat. No. 6,414,102B
[Patent Document 4] JP2010-43246A

SUMMARY OF INVENTION

Technical Problem

The present invention addresses the problem of providing a cross-copolymer having excellent flexibility, heat resistance, cold resistance, and mechanical properties. The present invention also addresses the problem of providing a resin composition which is prepared using the cross-copolymer, has excellent compatibility with polyolefin resins and/or aromatic resins, and has excellent flexibility, heat resistance, and cold resistance.

Solution to Problem

An aspect of the present invention provides a cross-copolymer produced by a polymerization process comprising a coordination polymerization step and a crossing step, wherein the coordination polymerization step comprises copolymerizing an ethylene monomer, a $C_{3-12}$ olefin monomer, and an aromatic polyene together using a single site coordination polymerization catalyst to synthesize an ethylene-olefin-aromatic polyene copolymer, and the crossing step comprises carrying out a polymerization in a co-presence of the ethylene-olefin-aromatic polyene copolymer and an aromatic vinyl compound monomer using an anionic polymerization initiator or a radical polymerization initiator, and wherein all the following conditions are met:

(1) with respect to a composition of the ethylene-olefin-aromatic polyene copolymer obtained in the coordination polymerization step, content of olefin is from 10 mol % to 50 mol %, content of aromatic polyene is from 0.01 mol % to 0.3 mol %, and the remainder equals content of ethylene;

(2) an weight-average molecular weight of the ethylene-olefin-aromatic polyene copolymer obtained in the coordination polymerization step is from 100,000 to 400,000;

(3) a mass ratio of the ethylene-olefin-aromatic polyene copolymer obtained in the coordination polymerization step to the cross-copolymer obtained in the crossing step is from 50 to 90 mass %; and (4) a total amount of heat of crystal fusion as observed in a temperature range of 40 to 130° C. when the cross-copolymer is determined by DSC is 50 J/g or less.

Another aspect of the present invention provides a resin composition comprising a polyolefin resin, an aromatic resin, and the cross-copolymer.

Still another aspect of the present invention provides a resin composition comprising a polyolefin resin and the cross-copolymer.

Still another aspect of the present invention provides a resin composition comprising an aromatic resin and the cross-copolymer.

Advantages

According to the present invention, a cross-copolymer has a proper copolymer composition during a coordination polymerization step, a proper weight-average molecular weight, and a proper mass ratio of an ethylene-olefin-aromatic polyene copolymer to the cross-copolymer. Also, the total amount of heat of crystal fusion of the cross-copolymer in a specific temperature range is a specific value or less. This cross-copolymer has excellent flexibility, heat resistance, cold resistance, and mechanical properties. In addition, a resin composition which is prepared using the cross-copolymer, has excellent compatibility, flexibility, cold resistance, and heat resistance.

DESCRIPTION OF EMBODIMENTS

Figure 1:
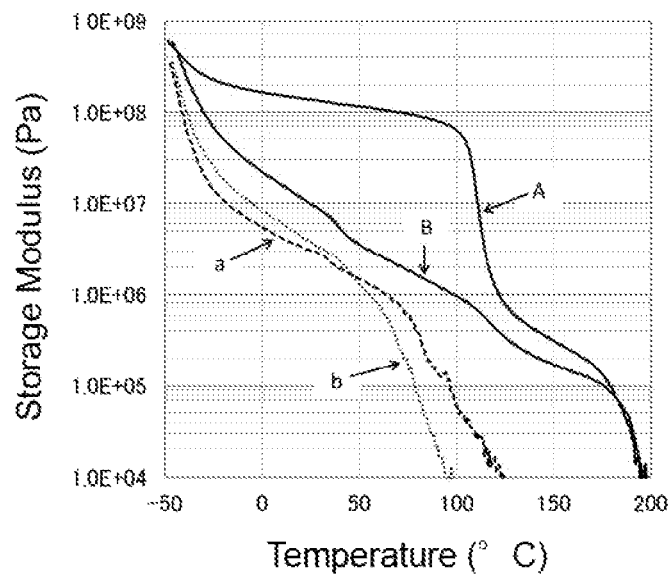
FIG. 1 shows a relationship between the temperature and the storage modulus of each cross-copolymer as obtained in Examples or each ethylene-olefin (1-hexene)-divinylbenzene copolymer obtained in their coordination polymerization step.

Hereinafter, embodiments of the present invention will be described in detail.

An aspect of the present invention provides a cross-copolymer produced by a polymerization process comprising a coordination polymerization step and a crossing step, wherein the coordination polymerization step comprises copolymerizing an ethylene monomer, a $C_{3-12}$ olefin monomer, and an aromatic polyene together using a single site coordination polymerization catalyst to synthesize an ethylene-olefin-aromatic polyene copolymer, and the crossing step comprises carrying out a polymerization in the co-presence of the ethylene-olefin-aromatic polyene copolymer and an aromatic vinyl compound monomer using an anionic polymerization initiator or a radical polymerization initiator, and wherein all the following conditions are met:

(1) with respect to the composition of the ethylene-olefin-aromatic polyene copolymer obtained in the coordination polymerization step, the content of olefin is from 10 mol % to 50 mol %, the content of aromatic polyene is from 0.01 mol % to 0.3 mol %, and the remainder equals the content of ethylene;

(2) the weight-average molecular weight of the ethylene-olefin-aromatic polyene copolymer obtained in the coordination polymerization step is from 100,000 to 400,000;

(3) the mass ratio of the ethylene-olefin-aromatic polyene copolymer obtained in the coordination polymerization step to the cross-copolymer obtained in the crossing step is from 50 to 90 mass %; and (4) the total amount of heat of crystal fusion as observed in a temperature range of 40 to 140° C. when the cross-copolymer is determined by DSC is 50 J/g or less. Here, a DSC measurement gives the total amount of heat of crystal fusion that is represented by a peak of crystal fusion observed in a temperature range of 40 to 140° C. as is determined by DSC while a sample has once been melted and then cooled to −100° C., followed by a temperature rise at a rate of 10° C. per min. The peak of crystal fusion observed in a temperature range of 40 to 140° C. is attributed to an ethylene chain.

As used herein, the olefin is a $C_{3-12}$ olefin monomer. Examples include α-olefins, norbornenes, and cyclic olefins (e.g., vinyl cyclohexane). One or more kinds of the olefin monomer may be used. Preferred are one or more $C_{4-12}$ α-olefins selected from the group consisting of 1-butene, 1-hexene, and 1-octene. As used herein, most preferred is 1-hexene or 1-octene, or a combination of olefin monomers including 1-hexene or 1-octene as a major component.

Here, an aromatic polyene is not particularly limited, and any conventional aromatic polyene may be used. From the viewpoints of promoting a polymerization reaction and imparting various physical properties to the resulting polymer, the aromatic polyene should have 10 to 30 carbon atoms, a plurality of double bonds (vinyl groups), and one or more aromatic groups, which allow for a coordination polymerization. Preferably, one of the double bonds (vinyl groups) is used for the coordination polymerization. While keeping this polymer status, the remaining double bonds may be used for an anionic polymerization or a radical polymerization. Particularly preferred is divinylbenzene. Preferable, o-divinylbenzene, p-divinylbenzene, and m-divinylbenzene are used singly or in combination.

As used herein, examples of the aromatic vinyl compound monomer include styrene and various kinds of substituted styrene such as p-methylstyrene, m-methylstyrene, o-methylstyrene, o-t-butylstyrene, m-t-butylstyrene, p-t-butylstyrene, p-chlorostyrene, and o-chlorostyrene. From the industrial aspect, preferred are styrene, p-methylstyrene, and p-chlorostyrene. Particularly preferred is styrene.

Processes for producing a common cross-copolymer is described in Japanese Translation of PCT application WO00/037517 and International Publication No. WO07/139116. The first purpose of the present invention is to provide a cross-copolymer with excellent flexibility and heat resistance. The second purpose of the present invention is to provide a cross-copolymer that is well miscible with various resins and generally possesses excellent performance as a modifier for polyolefin resins, a compatibility accelerator for polyolefin resins and aromatic (styrene-based) resins, and an adhesive that bonds polyolefin resins to various materials. Such a cross-copolymer has to meet the following conditions. Specifically, with respect to the composition of the ethylene-olefin-aromatic polyene copolymer obtained in the coordination polymerization step, the content of olefin is from 10 mol % to 50 mol % and preferably 10 mol % to 20 mol %; the content of aromatic polyene is from 0.01 mol % to 0.3 mol % and preferably from 0.01 mol % to 0.1 mol %; and the remainder equals the content of ethylene. The weight-average molecular weight of the ethylene-olefin-aromatic polyene copolymer may be appropriately modified depending on the purposes. The weight-average molecular weight is preferably from 100,000 to 400,000 and more preferably from 150,000 to 400,000. The molecular weight distribution (Mw/Mn) ranges usually from 1.5 to 6, preferably from 1.5 to 4, and more preferably from 1.8 to 3 inclusive.

The mass ratio of the ethylene-olefin-aromatic polyene copolymer obtained in the coordination polymerization step to the cross-copolymer finally obtained in the crossing step is from 50 to 90 mass % and preferably from 60 to 90 mass %. The total amount of heat of crystal fusion as observed in a temperature range of 40 to 140° C. when the cross-copolymer is determined by DSC is 50 J/g or less. The molecular weight of a crossing chain, namely the polymer chain of the aromatic vinyl compound, may be appropriately modified depending on the purposes and is not particularly limited. The weight-average molecular weight (Mw) is preferably from 10,000 to 150,000 and more preferably from 20,000 to 100,000. The molecular weight distribution (Mw/Mn) ranges usually from 1.0 to 6.0 inclusive. It is difficult to directly determine the molecular weight of the crossing chain. As used herein, the molecular weight is defined as the same as that of a homopolymer of the aromatic vinyl compound that is not cross-copolymerized. In this way, the molecular weight of a homopolymer of the aromatic vinyl compound as separated using a suitable known procedure such as solvent fractionation is employed.

The following describes the above specification in view of the physical properties of the cross-copolymer, a final product.

Here, when the content of olefin in the ethylene-olefin-aromatic polyene copolymer as obtained in the coordination polymerization step is lower than the above-described range, the cross-copolymer may have increased crystallinity, resulting in decreased flexibility. Regarding the flexibility, the JIS-A hardness is preferably 85 or less, or the modulus of elongation is preferably 50 MPa or less.

Meanwhile, this cross-copolymer is characterized by a flexible, heat-resistant elastomer of which at high temperatures, a certain degree or more of the elastic modulus and strength is maintained and the melting and/or fluidization unlikely occur. Specifically, the storage modulus as obtained through a viscoelasticity measurement is preferably $1 \times 10^5$ Pa or more at 140° C. In addition, this cross-copolymer is characterized by a flexible, cold-resistant elastomer of which a certain degree of the flexibility is maintained at low temperatures. Specifically, the storage modulus as obtained through a viscoelasticity measurement is preferably $1 \times 10^9$ Pa or less at −40° C.

When the content of olefin is lower than the above range, the cross-copolymer has an increased hardness at low temperatures, in particular. Further, the amount of heat of crystal fusion is higher than the above value. This may result in a significant change in the physical properties at or near the melting point of the crystal, in particular, a change in the elastic modulus. Consequently, the resulting cross-copolymer cannot meet the conditions with respect to the above storage modulus in some cases.

When the mass ratio of the ethylene-olefin-aromatic polyene copolymer obtained in the coordination polymerization step to the cross-copolymer finally obtained is lower than the above range, the resulting cross-copolymer may have decreased flexibility. Accordingly, the resulting cross-copolymer may not meet the flexibility conditions such as a JIS-A hardness of 85 or less or a modulus of elongation of 50 MPa or less.

When the weight-average molecular weight of the ethylene-olefin-aromatic polyene copolymer and/or the crossing chain is lower than the above range, the heat resistance may decrease. Consequently, the resulting cross-copolymer cannot meet the conditions with respect to the above storage modulus in some cases.

When the weight-average molecular weight of the ethylene-olefin-aromatic polyene copolymer and/or the crossing chain is higher than the above ranges, the molding processability is likely to decrease. When the content of aromatic polyene in the ethylene-olefin-aromatic polyene copolymer as obtained in the coordination polymerization step is less than 0.01 mol %, the cross-copolymer may not meet each physical property specified for the cross-copolymer set forth in the present application. When the content exceeds 0.3 mol %, the molding processability may decrease. Further, when the content is set to less than 0.1 mol %, the cross-copolymer can exhibit further excellent molding processability and superior compatibility with the following other resins.

The glass transition temperature on the lower temperature side of the cross-copolymer as obtained in the present invention is −30° C. or less and preferably −40° C. or less. The cross-copolymer, which satisfies the above ranges, according to the present invention can demonstrate the above flexibility, heat resistance, and cold resistance as well as elongation at break of 300% or more when tested in a tensile test.

The following describes the above specification in view of the compatibility between various resins and the cross-copolymer, a final product. Here, when the composition of the ethylene-olefin-aromatic polyene copolymer as obtained in the coordination polymerization step is out of the above-described ranges, the resulting cross-copolymer may have decreased compatibility with polyolefin resins, in particular, polypropylene. If the weight-average molecular weight is lower than the above ranges, prescribed impact resistance may not be obtained in the case where the cross-copolymer is used as a modifier to enhance impact resistance of, for example, polypropylene. In addition, when the above content of olefin is out of the above range or the weight-average molecular weight is lower than the above range, use of the cross-copolymer as a compatibility accelerator for polyolefin resins and aromatic (styrene-based) resins may cause the resulting resin composition to be less stretchable and become fragile.

When the mass ratio of the ethylene-olefin-aromatic polyene copolymer obtained in the coordination polymerization step to the cross-copolymer finally obtained is not more than the above range, the compatibility with olefin resins may decrease. Consequently, this may result in decreased mechanical properties of the resulting resin composition and/or a compatibilized resin composition. By contrast, when the mass ratio is not less than the above range, the compatibility with aromatic resins may decrease. Consequently, this may result in decreased mechanical properties of the resulting resin composition and/or a compatibilized resin composition. If the amount of heat of crystal fusion of the final cross-copolymer is higher than the above, the compatibility with polyolefin resins, in particular, polypropylene may decrease. In addition, use of the cross-copolymer as a compatibility accelerator for polyolefin resins and aromatic (styrene-based) resins may cause the resulting resin composition to be less stretchable and become fragile.

A more preferable cross-copolymer according to the present invention meets the above conditions and additional conditions as follows: with regard to the composition of the ethylene-olefin-aromatic polyene copolymer obtained in the coordination polymerization step, the content of olefin is from 10 mol % to 20 mol % and more preferably from 10 mol % to 15 mol %; the weight-average molecular weight (Mw) is from 100,000 to 400,000 and preferably from 150,000 to 400,000; and the mass ratio of the ethylene-olefin-aromatic polyene copolymer obtained in the coordination polymerization step to the cross-copolymer obtained after the crossing step is from 60 to 90 mass %. The preferable cross-copolymer that meets all the above conditions may have much superior heat resistance and may thus have a heat distortion temperature of 140° C. or more and preferably 160° C. or more when tested in a heat distortion test. Furthermore, the δL value with respect to residual elongation during a viscoelasticity measurement should be 20% or less at 140° C. and preferably 10% or less. As used herein, the term "δL value" refers to the ratio of the residual elongation (δL) to the initial length of a sample when viscoelasticity is measured (at a measurement frequency of 1 Hz) while the initial sample length is set to 10 mm. When the δL is 10%, the length of a sample during the measurement is 11 mm. In the viscoelasticity measurement, tensile stress is repeatedly applied to a stripe-shaped sheet sample. Accordingly, the sample temperature increases as the sample is repeatedly stretched. At that time, at least a certain minimum tension of the sample is maintained. Then, when the heat resistance of the sample is low or the elastic recovery decreases, the length of sample measured increases as the temperature rises. When the residual elongation (δL) is small at that temperature, it is indicated that the heat resistance is high, that is, the elastic recovery is enhanced.

In addition, the mechanical properties are good, so that a tensile test can demonstrate that the strength at break is 12 MPa or more and the elongation at break is 300% or more. In view of the mechanical properties, the content of olefin is still more preferably from 10 mol % to 14 mol % inclusive. If these conditions are met, it can be demonstrated that the strength at break is 18 MPa or more and the elongation at break is 500% or more.

The composition of the ethylene-olefin-aromatic polyene copolymer as obtained after the above coordination polymerization step may be controlled by changing the concentrations of monomers in a polymerization solution or by selecting a catalyst under given polymerization conditions. Generally speaking, the concentrations of monomers in a polymerization solution may be controlled by changing an ethylene gas partial pressure and/or an olefin monomer partial pressure or by injecting weighed monomers into a polymerization vessel. The molecular weight and molecular weight distribution of the ethylene-olefin-aromatic polyene copolymer may be, in general, controlled by selecting a catalyst or a polymerization temperature or by adding a suitable chain transfer agent. A chain transfer agent may be used.

When the weight-average molecular weight is set to 100,000 or more, the compatibility with olefin resins can be enhanced. In addition, when the weight-average molecular weight is set to 400,000 or less, the molding processability increases.

A single site coordination polymerization catalyst used for the coordination polymerization step is composed of a transition metal compound and a promoter. The present invention may use a known single site coordination polymerization catalyst. The single site coordination polymerization catalysts, in particular, transition metal compounds may be used singly or in combination. The single site coordination polymerization catalysts as described in WO00/037517 and WO2007/139116 may be used. More preferably, a transition metal compound selected from the following general formulae (1), (2), and (3) is used as the transition metal compound.

[Chemical Formula 1]

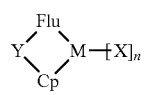

(1)

In the general formula (1), Flu represents a fluorenyl group or a substituted fluorenyl group and Cp represents a cyclopentadienyl group or a substituted cyclopentadienyl group. In addition, Y is a substituted methylene group having bonds to Flu and Cp and a substituent of the methylene group is hydrogen or a $C_{1-10}$ hydrocarbon group. In addition, M is a metal selected from zirconium, hafnium, and titanium. In addition, X is a halogen, a $C_{1-15}$ hydrocarbon group, a $C_{1-15}$ alkoxide group, a $C_{1-15}$ amide group, or a $C_{3-15}$ alkylsilane group. In addition, n is an integer of 1 or 2. Provided that there are a plurality of Xs, the plurality of Xs may be bonded to each other. JP-A-2010-43246 discloses a transition metal compound represented by the general formula (1).

[Chemical Formula 2]

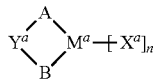

(2)

In the general formula (2), A and B, each independently, represent a group selected from a benzoindenyl group, a substituted benzoindenyl group, an indenyl group, and a substituted indenyl group. $Y^a$ is a substituted boron group that has bonds to A and B and has, as a substituent, hydrogen or a $C_{1-20}$ hydrocarbon group. The substituent of $Y^a$ may contains 1 to 3 nitrogen, boron, silicon, phosphorus, selenium, oxygen, or sulfur atoms. The substituent may have a ring structure. $X^a$ each independently represents hydrogen, a halogen, a $C_{1-15}$ alkyl group, a $C_{3-15}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide or amino group having hydrogen or a $C_{1-22}$ hydrocarbon substituent. In addition, n is an integer of 1 or 2. In addition, provided that there are a plurality of $X^a$s, the plurality of $X^a$s may be bonded to each other. In addition, $M^a$ is zirconium, hafnium, or titanium. WO01/068719 discloses a transition metal compound represented by the general formula (2).

[Chemical Formula 3]

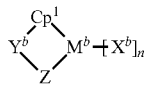

(3)

In the general formula (3), $Cp^1$ is a group selected from an unsubstituted or substituted cyclopentaphenanthryl group, an unsubstituted or substituted benzoindenyl group, an unsubstituted or substituted cyclopentadienyl group, an unsubstituted or substituted indenyl group, and an unsubstituted or substituted fluorenyl group. As used herein, the substituted cyclopentaphenanthryl group, substituted benzoindenyl group, substituted cyclopentadienyl group, substituted indenyl group, or substituted fluorenyl group refers to a cyclopentaphenanthryl group, benzoindenyl group, cyclopentadienyl group, indenyl group, or fluorenyl group in which at least one substitutable hydrogen is substituted by a $C_{1-20}$ alkyl group, a $C_{6-10}$ aryl group, a $C_{7-20}$ alkylaryl group, a halogen atom, an $OSiR_3$ group, an $SiR_3$ group, or a $PR_2$ group (where any R represents a $C_{1-10}$ hydrocarbon group). $Y^b$ has bonds to $Cp^1$ and Z and represents a hydrogen- or $C_{1-15}$ hydrocarbon group-containing methylene group, a silylene group, an ethylene group, a germirene group, or a boron group. The substituents may each be the same or different. In addition, $Y^b$ may have a ring structure. Z contains a nitrogen atom, an oxygen atom, or a sulfur atom, has a bond to $Y^b$ via a ligand coordinated to $M^b$ with the nitrogen, oxygen, or sulfur atom, and is a group having hydrogen or a $C_{1-15}$ substituent. $M^b$ is zirconium, hafnium, or titanium. $X^b$ represents hydrogen, a halogen, a $C_{1-16}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamide group having a $C^{1-6}$ alkyl substituent. In addition, n is an integer of 1 or 2. WO99/14221, EP416815, and U.S. Pat. No. 6,254,956 disclose transition metal compounds represented by the general formula (3). Because a copolymer with a high molecular weight and less self-cross-linking should be made very active, more preferred is a transition metal compound represented by the general formula (1) or (2).

The promoter that is used together with the above transition metal compound is not particularly limited and any known promoter that has been used in combination with conventional transition metal compounds may be used. In view of high activity during a polymerization reaction, a boron compound or alumoxane such as methylaluminoxane (also referred to as methylalumonoxane or MAO) is preferably used as such a promoter. Examples of the promoter used include promoters and alkyl aluminum compounds disclosed in EP-0872492A2, JP-A-11-130808, JP-A-09-309925, WO00/20426, EP0985689A2, and JP-A-06-184179. The promoter such as alumoxane may be used such that the molar ratio of aluminum atoms/transition metal atoms per transition metal compound is preferably from 0.1 to 100000 and more preferably from 10 to 10000. When this molar ratio is 0.1 or more, the transition metal compound may be activated effectively. When this molar ratio is 100000 or less, the additive amount of the promoter may be reduced, which is economically advantageous.

Meanwhile, when a boron compound is used as the promoter, the molar ratio of boron atoms/transition metal atoms is preferably from 0.01 to 100, more preferably from 0.1 to 10, and still more preferably 1.0. When this molar ratio is 0.01 or more, the transition metal compound may be activated effectively. When this molar ratio is 100 or less, the additive amount of the promoter may be reduced, which is economically advantageous. Note that when any kind of the promoter materials is used, the transition metal compound and the promoter may be mixed and prepared at other than a polymerization reactor or may be mixed in a reactor during polymerization.

When the ethylene-olefin-aromatic polyene copolymer is produced during the coordination polymerization step of the manufacture of the cross-copolymer, the above exemplified monomers, transition metal compound, and promoter are made to contact each other. Any known method may be used for determining the order of the contact, and may be used as a contact procedure.

Examples of the copolymerization process include: a process for polymerization using liquid monomers without using a solvent; and a process using a single or mixed solvent containing halogenated hydrocarbon, or saturated aliphatic or aromatic hydrocarbon such as pentane, hexane, heptane, cyclohexane, benzene, toluene, ethyl benzene, xylene, chloro-substituted benzene, chloro-substituted toluene, methylene chloride, and chloroform. Preferably, a mixed alkane-based solvent, cyclohexane, toluene, or ethyl benzene, for example, may be used. Any of a solution polymerization and a slurry polymerization may be used as the polymerization process. In addition, if desired, any of a batch polymerization, continuous polymerization, preparatory polymerization, and multiplex polymerization may be used.

A single or combined tank-type polymerization vessel, a linear or looped pipe-type polymerization reactor, or a single or combined pipe-type polymerization reactor may be used. The pipe-type polymerization vessel may be provided with any known mixing device (e.g., a dynamic or static mixer, a static mixer doubled as a heat remover) and/or any known cooling device (e.g., a cooler doubled as a capillary for removing heat). In addition, a batch-type preparatory polymerization vessel may be included.

The polymerization temperature may be suitably from −78° C. to 200° C. When the polymerization temperature is lower than −78° C., the temperature is industrially disadvantageous. When the polymerization temperature exceeds 200° C., the transition metal compound is decomposed, which is unsuitable. From the industrial point of view, the polymerization temperature is preferably from 0 to 160° C. and more preferably from 30 to 160° C.

The pressure during the polymerization is suitably from 0.1 to 100 atm, preferably from 1 to 30 atm, and more preferably from 1 to 10 atm from the industrial point of view.

In the crossing step of the production process according to the present invention, an anionic polymerization initiator or a radical polymerization initiator is used to carry out a polymerization under the co-presence of the ethylene-olefin-aromatic polyene copolymer obtained in the coordination polymerization step and an aromatic vinyl compound monomer. In the crossing step according to the present invention, the above aromatic vinyl compound monomer as well as the aromatic polyene, which has not been polymerized in the coordination polymerization step and remains in a small amount in the polymerization solution, may be subject to polymerization.

The crossing step of the present invention is performed after the above coordination polymerization step. At this time, the copolymer obtained in the coordination polymerization step may be used in the crossing step after purification and/or separation from the polymerization solution by means of any polymer recovery method including, for example, a crumb-forming method, a steam stripping method, and a method for directly removing a solvent using a devolatilization tank and a devolatilization extruder, etc. However, it is economically preferable to use, for the following crossing step, the residual olefin from the polymerization solution after the coordination polymerization with or without releasing pressure. One of the features of the present invention is to be able to use, in the crossing step, the polymer-containing polymerization solution without separating the polymer from the polymerization solution.

An anionic polymerization initiator may be used in the crossing step. That is, an anionic polymerization may be carried out. In this case, a solvent should not cause undesirable phenomena (e.g., a chain transfer) during the anionic polymerization. Preferable examples include a mixed alkane-based solvent, cyclohexane, and benzene. When the polymerization temperature is 150° C. or less, other solvents such as toluene and ethyl benzene may be used. As the polymerization process, any known process used for the anionic polymerization may be used. As used herein, it is optionally determined which of the aromatic vinyl compound monomer and the anionic polymerization initiator should be added first in the order. That is, the aromatic vinyl compound monomer may be first added to the polymerization solution and be mixed, followed by addition of the anionic polymerization initiator. Alternatively, the anionic polymerization initiator may be first added, followed by addition of the aromatic vinyl compound monomer. In the former, it seems to contain a large amount of the structure (cross-conjugate) in which the main chain, the ethylene-olefin-aromatic polyene copolymer obtained in the coordination polymerization step, and the crossing chain, the aromatic vinyl compound polymer chain, are conjugated by a grafting-through method. In the latter, it seems to contain a large amount of the structure (branched conjugate) produced by a grafting-from method. The former is an industrially preferable polymerization process because of better reproducibility. The cross-copolymer according to the present invention can be produced by "a manufacturing method comprising polymerization steps comprising a coordination polymerization step and a crossing step, wherein the coordination polymerization step comprises copolymerizing an ethylene monomer, a $C_{3-12}$ olefin monomer, and an aromatic polyene together using a single site coordination polymerization catalyst to synthesize an ethylene-olefin-aromatic polyene copolymer, and the crossing step comprises carrying out a polymerization in the co-presence of the ethylene-olefin-aromatic polyene copolymer and an aromatic vinyl compound monomer using an anionic polymerization initiator or a radical polymerization initiator, and wherein additional specific conditions are met for the copolymer". Because the copolymer is obtained by a particular manufacturing method, the structure may vary. The polymerization temperature may be suitably from −78° C. to 200° C. When the polymerization temperature is lower than −78° C., the temperature is industrially disadvantageous. When the polymerization temperature exceeds 150° C., a chain transfer, etc., occurs, which is unsuitable. From the industrial point of view, the polymerization temperature is preferably from 0 to 200° C. and more preferably from 30 to 150° C.

The pressure during the polymerization is suitably from 0.1 to 100 atm, preferably from 1 to 30 atm, and more preferably from 1 to 10 atm from the industrial point of view.

A known anionic polymerization initiator may be used in the crossing step according to the present invention. Preferable examples include an alkyl lithium compound and a lithium or sodium salt of biphenyl, naphthalene, or pyrene. More preferred are sec-butyl lithium and n-butyl lithium. In addition, a multifunctional initiator, a dilithium compound, or a trilithium compound may be used. Further, if needed, a known anionic polymerization terminal coupling agent may be used. When methylalumonoxane is used as a polymerization catalyst promoter during the coordination polymerization step, the amount of the initiator is preferably one equivalent or more of the oxygen atom included therein and more preferably two equivalents or more. When a boron compound is used as the polymerization catalyst promoter during the coordination polymerization step, the amount is significantly small when compared with the amount of the oxygen atom in the methylalumonoxane. Thus, it is possible to decrease the amount of the initiator.

A radical polymerization initiator may be used in the crossing step. That is, a radical polymerization may be carried out. The conditions and processes are specified in detail in WO00/037517. When the crossing step according to the present invention is performed, preferred is an anionic polymerization because a high polymerization speed, namely a high monomer conversion rate is achieved in a short time and the conversion rate of almost 100% can be easily accomplished.

In addition, the following characteristics can be exhibited by the present cross-copolymer produced by using styrene as an aromatic vinyl compound, that is, a cross-copolymer produced by a manufacturing method using polymerization steps comprising a coordination polymerization step and a crossing step, wherein the coordination polymerization step comprises copolymerizing an ethylene monomer, a $C_{3-12}$ olefin monomer, and an aromatic polyene together using a single site coordination polymerization catalyst to synthesize an ethylene-olefin-aromatic polyene copolymer, and the crossing step comprises carrying out a polymerization in the co-presence of the ethylene-olefin-aromatic polyene copolymer and a styrene monomer using an anionic polymerization initiator or a radical polymerization initiator. One of the characteristics is that the glass transition temperature, which occurs due to the polystyrene chain, as determined using the temperature corresponding to the peak of tan δ obtained through a viscoelasticity measurement is from 105° C. to 145° C. and preferably from 110° C. to 140° C. Additional description can indicate the characteristics in which in a viscoelasticity measurement generally known to those skilled in the art, the glass-transition temperature, which occurs due to the polystyrene chain, is 5° C. or more higher and preferably 10° C. or more higher than that of a commercially available hydrogenated block copolymer.

The above characteristics are considered to have something to do with the increased heat resistance of the cross-copolymer according to the present invention.

Preferably, the cross-copolymer having the above characteristics further meets all the following conditions:

(1) with respect to the composition of the ethylene-olefin-aromatic polyene copolymer obtained in the coordination polymerization step, the content of olefin is from 10 mol % to 50 mol %, the content of aromatic polyene is from 0.01 mol % to 0.3 mol %, and the remainder equals the content of ethylene;

(2) the weight-average molecular weight of the ethylene-olefin-aromatic polyene copolymer obtained in the coordination polymerization step is from 100,000 to 400,000;

(3) the mass ratio of the ethylene-olefin-aromatic polyene copolymer obtained in the coordination polymerization step to the cross-copolymer obtained in the crossing step is from 50 to 90 mass %; and (4) the total amount of heat of crystal fusion as observed in a temperature range of 40 to 140° C. when the cross-copolymer is determined by DSC is 50 J/g or less.

This preferable cross-copolymer can exhibit the following characteristics: the JIS-A hardness is 85 or less or the modulus of elongation is 50 MPa or less; the elongation at break is shown to be 300% or more in a tensile test; the storage modulus obtained in a viscoelasticity measurement is $1 \times 10^5$ Pa or more at 140° C.; and the storage modulus obtained in a viscoelasticity measurement is $1 \times 10^9$ Pa or less at −40° C.

The most preferable cross-copolymer according to the present invention is characterized in that the content of olefin in the ethylene-olefin-aromatic polyene copolymer obtained in the coordination polymerization step is from 10 mol % to 20 mol %. In addition, the mass ratio of the ethylene-olefin-aromatic polyene copolymer obtained in the coordination polymerization step to the cross-copolymer obtained after the crossing step is from 60 to 90 mass %.

This most preferable cross-copolymer can exhibit the following characteristics: the δL value obtained in a viscoelasticity measurement is 20% or less at 140° C.; the heat distortion temperature is 140° C. or more; and, in addition, a tensile test can demonstrate that the strength at break is 12 MPa or more and the elongation at break is 300% or more.

The present invention is described from another point of view. The block copolymer having a polystyrene chain is characterized in that the glass transition temperature, which occurs due to the polystyrene chain, as determined using the temperature corresponding to the peak of tan δ obtained through a viscoelasticity measurement is from 105° C. to 145° C. and preferably from 110° C. to 140° C. This characteristic cannot be observed with respect to conventional block copolymers such as hydrogenated block copolymers (e.g., SEBS and SEPS).

The following describes applications of the cross-copolymer according to the present invention.

The cross-copolymer according to the present invention may be used as a compatibility accelerator for "polyolefin resins" and "aromatic resins". In addition, the cross-copolymer according to the present invention may be used for a resin composition and/or as a modifier for "polyolefin resins". Further, the cross-copolymer according to the present invention may be used for a resin composition and/or as a modifier for "aromatic resins".

Other terms used to describe the applications mean as follows.

"Polyolefin Resins"

As used herein, the polyolefin resins refer to resins, including soft to hard resins, containing 50 mass % or more of a $C_{2-20}$ olefin monomer component per total resin. Such examples include low-density polyethylene (LDPE), high-density polyethylene (HDPE), linear low-density polyethylene (LLDPE), isotactic polypropylene (i-PP), syndiotactic polypropylene (s-PP), atactic polypropylene (a-PP), a propylene-ethylene block copolymer, a propylene-ethylene random copolymer, an ethylene-propylene-diene copolymer (EPDM), an ethylene-vinyl acetate copolymer, an ethylene-acrylic acid copolymer, an ethylene-acrylic acid ester copolymer, a cyclic olefin polymer (e.g., polyisobutene, polybutene, polynorbonene), and a cyclic olefin copolymer (e.g., an ethylene-norbornene copolymer). If necessary, an olefin-based resin may be produced by copolymerizing a diene compound such as butadiene and α,ω-diene.

In order to exert performance as a practical resin, the weight-average molecular weight of the above olefin-based polymer in terms of styrene is 10,000 or more and preferably 30,000 or more.

"Aromatic Resins"

As used herein, the aromatic resins refer to an aromatic vinyl compound polymer and copolymer, aromatic polyester, aromatic polyamide, aromatic polyimide, and polyphenylene ether resins.

The aromatic vinyl compound polymer and copolymer mean an aromatic vinyl compound homopolymer and a copolymer containing 10 mass % or more and preferably 30 mass % or more of an aromatic vinyl compound and at least one monomer component copolymerizable with the aromatic vinyl compound. Examples of an aromatic vinyl compound monomer used for the aromatic vinyl compound-based polymer include styrene and a variety of substituted styrenes (e.g., p-methylstyrene, m-methylstyrene, o-methylstyrene, o-t-butylstyrene, m-t-butylstyrene, p-t-butylstyrene, α-methylstyrene). Other examples include a compound having multiple vinyl groups per molecule (e.g., divinylbenzene). In addition, a copolymer of these aromatic vinyl compounds may be used. Note that the conformation between aromatic groups of the aromatic vinyl compound may be atactic, isotactic, or syndiotactic.

Examples of the monomer copolymerizable with the aromatic vinyl compound include butadiene, isoprene, other conjugated diene compounds, acrylic acid, methacrylic acid, an amide derivative and an ester derivative, and maleic acid and a derivative thereof. The type of copolymerization may be any of a block copolymerization, a tapered block copolymerization, a random copolymerization, and an alternate copolymerization. Further, it should be fine that the above aromatic vinyl compound is subject to a graft polymerization with a polymer containing the above monomer and the content of the aromatic vinyl compound is 10 mass % or more and preferably 30 mass % or more.

In order to exert performance as a practical resin, the weight-average molecular weight of the above aromatic vinyl compound-based polymer in terms of styrene is 30,000 or more and preferably 50,000 or more.

Examples of the aromatic vinyl compound-based resin used include isotactic polystyrene (i-PS), syndiotactic polystyrene (s-PS), atactic polystyrene (a-PS) rubber reinforced polystyrene (HIPS), an acrylonitrile-butadiene-styrene copolymer (ABS) resin, a styrene-acrylonitrile copolymer (AS resin), a styrene-methyl methacrylic acid ester copolymer (e.g., a styrene-methyl methacrylate copolymer), a styrene-diene block/tapered copolymer (e.g., SBS, SIS), a hydrogenated styrene-diene block/tapered copolymer (e.g., SEBS, SEPS), a styrene-diene copolymer (e.g., SBR), a hydrogenated styrene-diene copolymer (e.g., hydrogenated SBR), a styrene-maleic acid copolymer, a styrene-maleic anhydride copolymer, and a styrene-maleic anhydride imide copolymer.

"Fillers"

Known fillers may be used. Preferable examples can include calcium carbonate, talc, clay, calcium silicate, magnesium carbonate, magnesium hydroxide, mica, barium sulfate, titanium oxide, aluminum hydroxide, silica, carbon black, wood powder, and wood pulp. In addition, glass fiber, known graphite, an electric conductive filler (e.g., carbon fiber) may be used.

"Plasticizers"

Examples of known plasticizes used include: paraffin-based, naphthene-based, and aromatic process oil; mineral oil-based softeners (e.g., liquid paraffin); castor oil; linseed oil; olefin-based wax; mineral wax; and various kinds of esters.

<Composition Containing Aromatic Vinyl Compound-Based Resin, Olefin Resin, and Cross-Copolymer>

The cross-copolymer according to the present invention may be suitably used as a compatibility accelerator for a polyolefin resin and an aromatic vinyl compound-based resin, and used for a composition containing them. When used for the composition, the content of the cross-copolymer is from 1 to 98 mass % per total mass. The total content of the olefin resin and the aromatic vinyl compound-based resin is from 99 to 2 mass % (provided that the content of each of the olefin resin and the aromatic vinyl compound-based resin is 1 mass % or more). Preferably, the content of the cross-copolymer is from 30 to 70 mass % per total mass; and the total content of the olefin resin and the aromatic vinyl compound-based resin is from 70 to 30 mass % (provided that the content of each of the olefin resin and the aromatic vinyl compound-based resin is 1 mass % or more). When used as the compatibility accelerator, the content of the cross-copolymer is, in particular, from 1 to 30 mass % per total mass among the component ranges of the above composition. The total content of the olefin resin and the aromatic vinyl compound-based resin is from 99 to 70 mass % (provided that the content of each of the olefin resin and the aromatic vinyl compound-based resin is 1 mass % or more). If necessary, this composition can be combined with one or more materials including the above and other resins, elastomers, rubber, plasticizers, fillers, and a stabilizer, an antioxidant, a light resistance enhancer, a UV absorber, a softener, a lubricant, a processing aid, a coloring agent, an antistatic agent, an antifog agent, an anti-blocking agent, a crystal nucleating agent, and a foaming agent.

<Composition Containing Cross-Copolymer and Olefin Resin>

With regard to the composition containing the cross-copolymer according to the present invention and an olefin resin, the content of the cross-copolymer is from 1 to 99 mass % and the content of the olefin resin is from 99 to 1 mass %. Preferably, the content of the cross-copolymer is 1 to 50 mass % and the content of the olefin resin is 99 to 50 mass %. This composition may be used to adjust a balance of the mechanical strength of the olefin resin. This composition is thus suited for general-purpose applications such as films and containers. This composition can also be used for automobile parts (e.g., a bumper, an instrument panel) and housing appliances (e.g., a refrigerator, a washing machine). In addition, the printability and coloring characteristics of the olefin resin can be enhanced.

The composition containing polypropylene, in particular, has improved impact resistance and is excellent in a balance of various mechanical properties (e.g., bending strength, bending elastic modulus). Further, the scratch resistance and wear resistance may also be enhanced when compared with those of polypropylene alone.

If necessary, this composition can be combined with one or more materials including the above and other resins, elastomers, rubber, plasticizers, fillers, and a stabilizer, an antioxidant, a light resistance enhancer, a UV absorber, a softener, a lubricant, a processing aid, a coloring agent, an antistatic agent, an antifog agent, an anti-blocking agent, a crystal nucleating agent, and a foaming agent.

<Composition Containing Cross-Copolymer and Aromatic Vinyl Compound-Based Resin>

With regard to the composition containing the cross-copolymer according to the present invention and an aromatic vinyl compound-based resin, the content of the cross-copolymer is from 1 to 99 mass % and the content of the aromatic vinyl compound-based resin is from 99 to 1 mass %. Depending on the content, this composition can exhibit a wide range of physical properties from very tough plastics to flexible elastomers. When the content of the cross-copolymer is 1 to 50 mass % and the content of the aromatic vinyl compound-based resin is 99 to 50 mass %, in particular, the composition may be useful as a very tough plastic. When the content of the cross-copolymer is 50 to 99 mass % and the content of the aromatic vinyl compound-based resin is 50 to 1 mass %, the composition may be useful as an elastomer having a wide range of mechanical properties, in particular, a high tensional modulus.

For example, in order to improve the physical property, as an elastomer, of the cross-copolymer according to the present invention, any amount of polystyrene is optionally added to give a composition. The composition containing 50 to 99 mass % of polystyrene per total mass has a higher initial elastic modulus, hardness, and heat resistance and is thus useful as an impact-resistant resin. For example, when polystyrene is added to give the cross-copolymer-containing composition in which the ethylene-styrene-diene copolymer is subject to a cross copolymerization with polystyrene, a novel styrene-based resin with impact resistance may be created. This composition is characterized by excellent surface gloss. In addition, when the composition contains various styrene-based resins (e.g., GP-PS, HI-PS, ABS, a styrene-acrylic acid ester copolymer, a styrene-methacrylic acid ester copolymer), an impact-resist or transparent novel styrene-based resin with a balance of physical properties can be created. The composition containing, in particular, a styrene-methacrylic acid ester copolymer (e.g., a styrene-methyl methacrylate copolymer) is very transparent, so that a wide range of physical properties from transparent plastics to transparent elastomers can be covered depending on its content.

If necessary, this composition can be combined with one or more materials including the above and other resins, elastomers, rubber, plasticizers, fillers, and a stabilizer, an antioxidant, a light resistance enhancer, a UV absorber, a softener, a lubricant, a processing aid, a coloring agent, an antistatic agent, an antifog agent, an anti-blocking agent, a crystal nucleating agent, and a foaming agent.

To manufacture the polymer composition according to the present invention, any known suitable blending method may be used. For example, a uniaxial or biaxial screw extruder, a Banbury mixer, a plastomill, a co-kneader, and/or a heating roll may be used to perform melt mixing. Before the melt mixing, each source material is optionally mixed using a Henschel mixer, a ribbon blender, a super mixer, a tumbler, etc. The melt mixing temperature is not particularly limited, and is usually from 100 to 300° C. and preferably from 150 to 250° C.

Examples of a method for molding various compositions according to the present invention can include any known molding methods (e.g., vacuum molding, injection molding, blow molding, extrusion molding).

As described above, the embodiments of the present invention have been illustrated. These embodiments are examples of the present invention. Accordingly, various configurations other than the above embodiments can be adopted.

EXAMPLES

Hereinafter, the present invention is further illustrated by referring to Examples. The present invention, however, is not limited to them.

[Analysis and Evaluation Procedure]

The following protocols were used to analyze copolymers obtained in the Examples.

($^1$H-NMR Spectrum)

$^1$H-NMR analysis was conducted to determine the content of each of units including an olefin, a diene, and an aromatic vinyl compound in a copolymer. An α-500 model (manufactured by JEOL Ltd.) and an AC250 model (manufactured by BRUCKER Inc.) were used. A sample was dissolved into 1,1,2,2-tetrachloroethane-d2. Measurement was carried out at room temperature when the sample was dissolved at room temperature. Measurement was carried out at 80 to 100° C. when the sample was not dissolved at room temperature. A known technique was used to determine the composition and the content of each unit while compared to the area of the resulting peak attributed to each unit. The mass ratio of the ethylene-olefin-aromatic polyene copolymer obtained in the coordination polymerization step to the final cross-copolymer obtained after the crossing step and their yield may be determined compared to the content of the ethylene-olefin-aromatic polyene copolymer and the content of the cross-copolymer. The mass % of the polystyrene chain obtained in the crossing step can likewise be calculated.

(Gas Chromatography Analysis)

The content of a divinylbenzene unit in the resin was calculated by subtracting the amount of unreacted divinylbenzene in a polymerization solution, as determined by gas chromatography analysis, from the amount of divinylbenzene used for the polymerization.

(Molecular Weight Determination)

Regarding the molecular weight, a GPC (gel permeation chromatography) measurement was used to calculate a number-average molecular weight and a weight-average molecular weight in terms of a polystyrene standard. The measurement was conducted using the following conditions.

Columns: Two TSK-GEL Multipore HXL-M (φ7.8×300 mm) (manufactured by Tosoh Corporation) were connected in series and used.
Column temperature: 40° C.
Detector: RI
Solvent: THF
Liquid flow rate: 1.0 ml/min
Sample concentration: 0.1 wt/vol %
Sample injection volume: 100 μl Regarding the molecular weight of a polymer insoluble in a THF solvent at room temperature, a high-temperature GPC (gel permeation chromatography) measurement was used to calculate a weight-average molecular weight in terms of a polystyrene standard. An HLC-8121 GPC/HT (manufactured by Tosoh Corporation) and 3 columns (TSKgel GMHHR-H (20) HT, φ7.8×300 mm) were used and o-dichlorobenzene was used as a solvent to carry out a measurement at 140° C.
Detector: RI
Sample concentration: 0.1 mass/vol %
Sample injection volume: 100 μl
Liquid flow rate: 1.0 ml/min (Gel Fraction Measurement)

The gel fraction of the cross-copolymer was determined in accordance with ASTM D-2765-84.

Specifically, 1.0 g of a precisely weighed polymer (a molding product with a diameter of about 1 mm and a length of about 3 mm) was enclosed in a stainless net bag with a 100-mesh size. Next, the resulting bag was weighed precisely. Then, this bag was put in boiling xylene for 5 hours.

After extraction, the net bag was removed and dried in vacuo at 90° C. for 10 hours or longer. After sufficient cooling, the net bag was precisely weighed, and the gel fraction of the cross-copolymer was calculated using the following equation.

Gel fraction (%)=the mass of the remaining gel in the net bag/the mass of the weighed cross-polymer×100.

(DSC Measurement)

A DSC measurement was performed, under a nitrogen stream, using a DSC6200 (manufactured by Seiko Instruments Inc.). Specifically, 10 mg of a resin was used and 10 mg of alumina was used as a reference. Then, an aluminum pan was used and a temperature was increased under a nitrogen atmosphere from room temperature to 240° C. at a programming rate of 10° C./min, followed by cooling to 120° C. at a rate of 20° C./min. After that, a DSC measurement was carried out while the temperature was increased to 240° C. at a programming rate of 10° C./min. Finally, the melting point, the amount of heat of crystal fusion, and the glass transition temperature were determined.

(MFR Measurement)

An MFR measurement was carried out at 200° C. in accordance with JIS K7210. Note that two conditions (i.e., a load of 22 N or 98 N) were used for the measurement.

(Sample Sheet Preparation)

Samples for physical property evaluation were molded by a heating press process (at a temperature of 250° C., a duration of 5 min, and a pressure of 50 kg/cm$^2$) into sheets with various thicknesses (i.e., 0.3, 1.0, and 2.0 mm).

(Viscoelasticity Measurement: Storage Modulus)

First, a measurement sample (8 mm×50 mm) was cut out from a film (with a thickness of 0.3 mm) prepared by the heating press process. A dynamic viscoelasticity measurement device (RSA-III, manufactured by Rheometric Scientific Inc.) was used to perform a measurement at a frequency of 1 Hz within a temperature range from −50 to 250° C. Then, the storage modulus, the loss modulus, the tan δ value, the residual elongation (δL) of the sample were determined.

Other measurement parameters are described as follows.
Measurement Frequency: 1 Hz
Programming Rate: 4° C./min
Length of Sample Measured: 10 mm
Test Type=Dynamic Temperature Ramp (DTempRamp)
Initial Static Force: 5.0 g
Auto Tension Sensitivity: 1.0 g
Max Auto Tension Rate: 0.033 mm/s
Max Applied Strain: 1.5%
Min Allowed Force: 1.0 g
(Heat Distortion Temperature)

A sample was used to hang a small JIS #2 (1/2) dumbbell in a given oven and was heated for 1 hour at prescribed temperatures. Here, the heat treatment temperatures were selected from temperatures from 80 to 200° C. with a 10° C. interval. Before and after the treatment, the length and the width of the sample in a lengthwise and a widthwise direction of the dumbbell were measured under conditions at 23±1° C. Then, the following equations were used to calculate an extension/contraction deformation rate. The maximum temperature at which the extension/contraction deformation rate in the lengthwise direction was within 5% was defined as a heat distortion temperature.

Elongation deformation rate (%)=100×(Length after test−Length before test)/Length before test.

Contraction deformation rate (%)=100×(Length before test−Length after test)/Length before test.

(Tensile Test: Modulus of Elongation and Elongation at Break)

In accordance with JIS K-6251, a sheet with a thickness of 1.0 mm was cut into JIS #2-1/2 type test pieces, and an AGS-100D model tensile tester (manufactured by Shimadzu Corporation) was used to perform a measurement under conditions at 23±1° C. and at a tension rate of 500 mm/min.
(JIS-A Hardness)

In accordance with a procedure for testing a durometer hardness of JIS K-7215 plastic, the sheets with a thickness of 2 mm were stacked to determine a JIS-A durometer hardness under conditions at 23±1° C. Note that this hardness is a momentary value.
[Source Material Preparation]
(i) Catalyst A Diphenylmethylene(fluorenyl)(cyclopentadienyl)zirconium dichloride (see the following general formula (4)) was synthesized by a known method such as a production process disclosed in J. Am. Chem. Soc., 110, 6255 (1988).

[Chemical Formula 4]

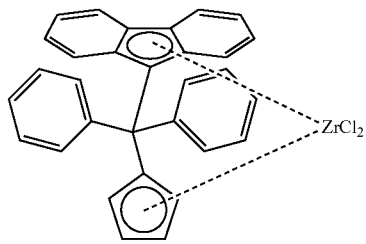

(4)

[Example 1] Manufacture of Cross-Copolymer

Catalyst A: Diphenylmethylene(fluorenyl)(cyclopentadienyl)zirconium dichloride was used as follows.

TABLE 1

| | Coordination polymerization step | | | | | | | | Crossing step | | |
|---|---|---|---|---|---|---|---|---|---|---|---|
| | Catalyst μmol | MAO mmol | Olefin kg | Solvent kg | Temperature ° C. | Ethylene MPa | DVB mmol | Ethylene Consumption L | Yield kg | Styrene kg | BuLi mmol | Yield kg |
| Ex. 1 | 100 | 50 | H; 2.6 | 21.3 | 77 | 0.60 | 79 | 1200 | 2.73 | 1.8 | 260 | 4.4 |
| Ex. 2 | 100 | 50 | H; 2.6 | 21.3 | 90 | 0.60 | 157 | 1200 | 2.63 | 1.2 | 260 | 3.7 |
| Ex. 3 | 100 | 100 | H; 2.6 | 21.3 | 75 | 0.40 | 79 | 1100 | 2.80 | 0.7 | 280 | 3.5 |
| Ex. 4 | 70 | 50 | H; 1.8 | 21.3 | 75 | 0.85 | 79 | 1300 | 2.10 | 0.9 | 180 | 3.0 |
| Ex. 5 | 50 | 50 | O; 2.6 | 21.3 | 75 | 0.60 | 79 | 1200 | 2.66 | 1.2 | 160 | 3.8 |
| CEx. 1 | 100 | 50 | H; 1.2 | 21.3 | 75 | 1.00 | 79 | 1500 | 2.26 | 0.65 | 160 | 2.9 |

Ex: Example
CEx: Comparative Example
Olefin H: 1-Hexene
Olefin O: 1-Octene

Under polymerization conditions designated in Table 1, a 50-L first polymerization vessel with a mixer and a heating and cooling jacket was used and 21.3 kg of a cyclohexane-containing solvent, 2.6 kg of a 1-hexene monomer, and 79 mmol of divinylbenzene (DVB) were put into the vessel and mixed while heating at an internal temperature of 40° C. About 100 L of dried nitrogen gas was used for bubbling and water content inside the system and of the polymerization solution was purged. Next, the internal temperature was raised to about 85° C. Then, 50 mmol of triisobutyl aluminum and, in addition, 50 mmol of MAO (modified MAO: MMAO, manufactured by Tosoh Finechem Corporation) were added. Immediately after that, ethylene was injected. After the pressure of the polymerization vessel had been stabilized at 0.60 MPa (0.50 MPaG), a catalyst solution which was 30 ml of a toluene solution containing 1 mmol of triisobutyl aluminum and 100 μmol of diphenylmethylene (fluorenyl)(cyclopentadienyl)zirconium dichloride was added to the vessel inside an autoclave to start a coordination polymerization step. The polymerization was performed while the internal temperature was kept at 90° C. and the pressure at 0.60 MPa. When the total flow volume of ethylene reached a prescribed amount (1200 L), the ethylene supply was stopped and the autoclave was rapidly cooled to 70° C. while the pressure was released. A small amount (several dozen ml) of the polymerization solution was sampled and mixed with methanol to precipitate a polymer. By doing so, a polymer sample during the coordination polymerization step was obtained. From this sample solution, the yield, composition, and molecular weight of the polymer during the coordination polymerization step were determined. Next, the polymerization solution was transferred to a 50-L second polymerization vessel with a mixer and a heating and cooling jacket. Then, 1.8 kg of a styrene monomer was added to the polymerization vessel and well stirred and mixed. After that, 260 mmol of n-butyl lithium was added and a crossing step (anionic polymerization step) was then conducted while the temperature was kept at 70° C. Finally, a cross-copolymer was synthesized. A small amount of the resulting polymerization solution was put into a large volume of a methanol solution while the solution was agitated. Afterwards, the cross-copolymer was recovered. This cross-copolymer was air-dried at room temperature for 24 hours. Then, the cross-copolymer was dried until no mass change was detected in vacuo at 80° C.

Examples 2 to 5

The same procedure as of Example 1 was used to carry out a polymerization under the polymerization conditions indicated in Table 1.

Comparative Example 1

The same procedure as of Example 1 was used to carry out a polymerization under the polymerization conditions indicated in Table 1.

With regard to each Example and the Comparative Example, the ethylene-olefin-aromatic polyene copolymer obtained in the coordination polymerization step and the cross-copolymer obtained after the crossing step were analyzed and their results are shown in Table 2. Tables 3 and 4 show the results of evaluating the cross-copolymers. It was found that each of the cross-copolymers obtained in Examples 1 to 5 exhibited the flexibility (JIS-A hardness, modulus of elongation), the cold resistance (glass-transition temperature, storage modulus at −40° C.), and the heat resistance (storage modulus at 140° C., δL value at 140° C.) according to the present invention. The cross-copolymer obtained in Example 3, in particular, has a JIS-A hardness of 20, which indicates significant flexibility, and has a storage modulus of $1 \times 10^5$ Pa or more at 140° C., which indicates conventionally unobservable heat resistance. In addition, the cross-copolymers obtained in Examples 1, 2, 4, and 5 satisfy the most preferable conditions according to the present invention and are flexible. Besides, the cross-copolymers exhibit a high heat distortion temperature of 140° C. or more and a high elastic recovery (low δL value) at high temperatures.

By contrast, with regard to the cross-copolymer obtained in Comparative Example 1, the content of olefin in the ethylene-olefin-aromatic polyene copolymer obtained in the coordination polymerization step was lower than the range of the present invention. Consequently, the cross-copolymer is hard and fails to meet the flexibility requirement (JIS-A hardness, modulus of elongation). In addition, the cold resistance (storage modulus at −40° C.) requirement according to the present invention is also not met.

TABLE 2

| | Coordination polymerization step | | | | Crossing step | | | Component proportion of copolymer obtained in the coordination polymerization step mass % |
|---|---|---|---|---|---|---|---|---|
| | Content of α-olefin mol % | Content of DVB mol % | Mw E+04 | Mw/Mn | PS mass % | PS Mw E+04 | PS Mw/Mn | |
| Ex. 1 | 15.0 | 0.028 | 24.5 | 2.1 | 38 | 4.6 | 1.9 | 62 |
| Ex. 2 | 15.0 | 0.054 | 16.1 | 2.1 | 29 | 3.5 | 1.7 | 71 |
| Ex. 3 | 21.5 | 0.030 | 24.8 | 2.0 | 20 | 2.8 | 1.7 | 80 |
| Ex. 4 | 11.5 | 0.027 | 23.0 | 2.1 | 30 | 4.8 | 1.5 | 70 |
| Ex. 5 | 12.0 | 0.030 | 22.3 | 2.0 | 30 | 4.0 | 1.4 | 70 |
| CEx. 1 | 6.3 | 0.026 | 16.0 | 2.2 | 22 | 5.1 | 1.7 | 78 |

TABLE 3

| | DSC | | | Viscoelasticity | | |
|---|---|---|---|---|---|---|
| | Tg °C. | Tm °C. | ΔH J/g | Storage modulus (Pa) | | δL (%) 140° C. |
| | | | | −40° C. | 140° C. | |
| Ex. 1 | −58 | −A | −B | 2.6E+08 | 3.0E+05 | 7 |
| Ex. 2 | −56 | −A | −B | 3.0E+08 | 2.1E+05 | 8 |
| Ex. 3 | −59 | −A | −B | 2.2E+07 | 1.2E+05 | 50 |
| Ex. 4 | −55 | 70 | 43 | 8.1E+08 | 9.0E+05 | 6 |
| Ex. 5 | −60 | 63 | 40 | 5.3E+08 | 4.8E+05 | 5 |
| CEx. 1 | −60 | 95 | 80 | 1.7E+09 | Measurement is impossible due to breakage | — |

−A: A peak indicating that the amount of heat of crystal fusion was 10 J/g or more was unobserved.
−B: The total amount of heat of crystal fusion was 10 J/g or less.

TABLE 4

| | JIS-A hardness | Stress at break MPa | elongation at break % | Tensile elastic modulus MPa | Heat distortion temperature °C. | MFR 200° C. 22N g/10 min | 200° C. 98N g/10 min | Gel fraction mass % |
|---|---|---|---|---|---|---|---|---|
| Ex. 1 | 82 | 16 | 1300 | 38.0 | 170 | 0.2 | 3.0 | Less than 1% |
| Ex. 2 | 55 | 13 | 2100 | 5.3 | 150 | 0.1 | 2.9 | Less than 1% |

TABLE 4-continued

|  | JIS-A hardness | Stress at break MPa | elongation at break % | Tensile elastic modulus MPa | Heat distortion temperature °C. | MFR 200° C. 22N g/10 min | MFR 200° C. 98N g/10 min | Gel fraction mass % |
|---|---|---|---|---|---|---|---|---|
| Ex. 3 | 20 | 3 | 700 | 1.3 | 90 | 0.7 | 12.7 | Less than 1% |
| Ex. 4 | 77 | 27 | 1150 | 17.0 | 170 | 0.04 | 1.1 | Less than 1% |
| Ex. 5 | 82 | 25 | 1600 | 31.0 | 180 | 0.1 | 3.8 | Less than 1% |
| CEx. 1 | 92 | 16 | 240 | 96.0 | 170 | No flow | No flow | Less than 1% |

FIG. 1 shows a relationship between the temperature and the storage modulus of each cross-copolymer as obtained in the Examples. As a comparison, disclosed is a relationship between the temperature and the storage modulus of each ethylene-olefin (1-hexene)-divinylbenzene copolymer, part of which was removed after completion of the coordination polymerization step. In the figure, the "A" denotes the cross-copolymer obtained in Example 1. The "B" denotes the cross-copolymer obtained in Example 2. In the figure, the "a" denotes the ethylene-olefin (1-hexene)-divinylbenzene copolymer obtained in Example 1. The "b" denotes the ethylene-olefin (1-hexene)-divinylbenzene copolymer obtained in Example 2. When compared with each ethylene-olefin (1-hexene)-divinylbenzene copolymer obtained in the coordination polymerization step, each cross-copolymer obtained after the crossing step (anionic polymerization step) exhibits a significantly high storage modulus at high temperatures, demonstrating that its heat resistance is significantly enhanced.

Figure 2:
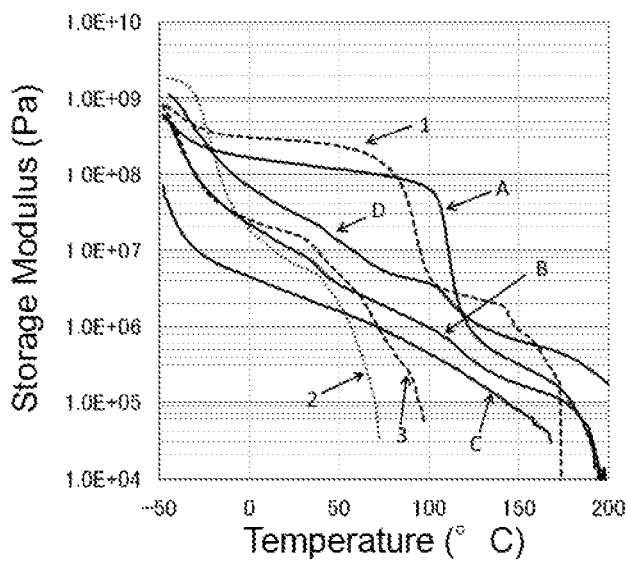
FIG. 2 shows a relationship between the temperature and the storage modulus of each cross-copolymer obtained in the Examples or each commercially available flexible resin or thermoplastic elastomer.

Compared with the cross-copolymers obtained in the Examples, FIG. 2 shows a relationship between the temperature and the storage modulus of each of ethylene-based random copolymers (an ethylene-octene copolymer (the content of octene was 12 mol %); and an ethylene-vinyl acetate copolymer (the content of vinyl acetate was 30 mass %)) and a hydrogenated block copolymer (SEPS), which were commercially available as flexible resins. In the figure, the "C" denotes the cross-copolymer obtained in Example 3. The "D" denotes the cross-copolymer obtained in Example 4. In the figure, the "1" denotes the hydrogenated block copolymer (SEPS). The "2" denotes the ethylene-vinyl acetate copolymer. The "3" denotes the ethylene-octene copolymer. The comparative resins exhibit the equivalent flexibility at room temperature. By contrast, a decrease in the storage modulus of each of the cross-copolymers of the Examples is small at high temperatures. Accordingly, each cross-copolymer exhibits a high storage modulus under high temperature conditions, indicating high heat resistance. The cross-copolymers obtained in Examples 3 and 4, in particular, are very flexible at from low temperatures to room temperature. Nevertheless, a decrease in the storage modulus at a high temperature of, for example, 140° C. is small, so that the heat resistance can be said to be high.

Figure 3:
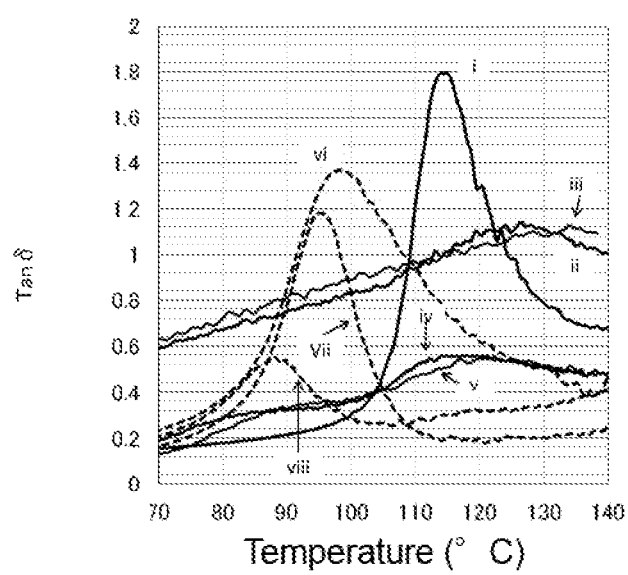
FIG. 3 shows a relationship between the temperature and the tan δ of each cross-copolymer obtained in the Examples or each commercially available flexible resin or thermoplastic elastomer.

FIG. 3 shows a relationship between the temperature and the tan δ (loss modulus/storage modulus) of each of the cross-copolymers obtained in the Examples, and a known resin and commercially available resins which are subject to comparison. The known resin used is a cross-copolymer obtained in accordance with the international publication WO2007139116 (the main chain: ethylene-styrene-divinylbenzene, the content of the main chain styrene was 24 mol %; the crossing chain: polystyrene, the content of polystyrene was 26 mass %; the MFR was 23 g/10 min at 200° C. with a loading of 98 N). The commercially available resins are a hydrogenated block copolymer SEPS (Septon 2007, manufactured by KURARAY CO., LTD.) and a hydrogenated block copolymer SEBS (Toughtek H-1053, manufactured by Asahi Kasei Corporation). The peak position (i.e., glass-transition temperature) of the tan δ curve with respect to each of the cross-copolymers according to the Examples is attributed to the polystyrene chain and ranges from 105 to 145° C. By contrast, the peak position (i.e., glass-transition temperature) of the tan δ curve with respect to each of the known resin and the commercially available SEPS and SEBS is attributed to the polystyrene chain, but ranges from 90 to 100° C. Table 5 lists the glass-transition temperatures as calculated from the peak position of the tan δ curve of each of the Examples and the SEPS and SEBS that are subject to comparison. Here, the glass-transition temperature, which occurs due to the polystyrene chain, of each of the cross-copolymers according to the Examples is 5° C. or more higher than that of each commercially available hydrogenated block copolymer.

TABLE 5

|  | Glass-transition temperature (° C.) determined from a peak position of tan δ |
|---|---|
| Ex. 1 | 114 |
| Ex. 2 | 129 |
| Ex. 3 | About 125 |
| Ex. 4 | 116 |
| Ex. 5 | 120 |
| SE | 99 |
| SEPS | 95 |
| SEBS | 89 |

Manufacture and Evaluation of Resin Compositions of Examples 6 to 8 and

Comparative Examples 2 to 7

As described below, resin compositions containing polypropylene and polystyrene were obtained.

A Brabender Plasticorder (PL2000, manufactured by Brabender, Inc.) was used to knead polystyrene (G200C, manufactured by TOYO STYRENE CO., LTD.), homopolypropylene (J106G, manufactured by Prime Polymer Co., Ltd.), and a compatibility accelerator (10 parts by mass) in a proportion (parts by mass) (a total of about 45 g) designated in Table 6 at a temperature of 200° C. and a rotation speed of 100 rpm for 10 min to prepare a sample. A hindered phenol-based antioxidant (Irg1076, manufactured by BASF GmbH) was used as an antioxidant. For Examples 6, 7, and 8, the cross-copolymers obtained in the above Examples 1, 2, and 5, respectively, were each used as a compatibility accelerator. In Comparative Example 2, no compatibility accelerator was used. For Comparative Example 3, the cross-copolymer obtained in the above Comparative Example 1 was used as a compatibility accelerator. For Comparative Examples 4 to 7, a commercially available SEBS (Toughtek H-1053, manufactured by Asahi Kasei Corporation), SEPS (Septon 8006, manufactured by KURARAY CO., LTD.), an ethylene-octene copolymer (Engage 8103, manufactured by The Dow Chemical Company), and a cross-copolymer obtained in accordance with the international publication WO2007139116 (the main chain: ethylene-styrene-divinylbenzene, the content of the main chain styrene was 24 mol %; the crossing chain: polystyrene, the content of polystyrene was 26 mass %; the MFR was 23 g/10 min at 200° C. with a loading of 98 N) were each used as a compatibility accelerator. A tensile test was carried out using a sheet (with a thickness of 1.0 mm) as obtained by molding the resulting composition by the above heating press process. Table 6 shows the results.

random copolymer (Engage, Comparative Example 6) nor a cross-copolymer (Comparative Example 7) known in a literature as having the main chain of an ethylene-styrene-based copolymer exhibited performance as a compatibility accelerator.

DESCRIPTION OF SYMBOLS a: Storage modulus curve with respect to the ethylene-olefin (1-hexene)-divinylbenzene copolymer obtained in Example 1.
b: Storage modulus curve with respect to the ethylene-olefin (1-hexene)-divinylbenzene copolymer obtained in Example 2.
A: Storage modulus curve with respect to the cross-copolymer obtained in Example 1.
B: Storage modulus curve with respect to the cross-copolymer obtained in Example 2.
C: Storage modulus curve with respect to the cross-copolymer obtained in Example 3.
D: Storage modulus curve with respect to the cross-copolymer obtained in Example 4.
1: Storage modulus curve with respect to the hydrogenated block copolymer (SEPS).

TABLE 6

|  |  |  | Ex. 6 | Ex. 7 | Ex. 8 | CEx. 2 | CEx. 3 | CEx. 4 | CEx. 5 | CEx. 6 | CEx. 7 |
|---|---|---|---|---|---|---|---|---|---|---|---|
| PS | G200C | parts by mass | 70 | 70 | 70 | 70 | 70 | 70 | 70 | 70 | 70 |
| PP | J106G | parts by mass | 30 | 30 | 30 | 30 | 30 | 30 | 30 | 30 | 30 |
| Cross-copolymer obtained in Ex. 1. | | parts by mass | 10 | | | | | | | | |
| Cross-copolymer obtained in Ex. 2. | | parts by mass | | 10 | | | | | | | |
| Cross-copolymer obtained in Ex. 5. | | parts by mass | | | 10 | | | | | | |
| Cross-copolymer obtained in CEx. 1. | | parts by mass | | | | | 10 | | | | |
| SEBS | H1053 | parts by mass | | | | | | 10 | | | |
| SEPS | 8006 | parts by mass | | | | | | | 10 | | |
| Engage | 8103 | parts by mass | | | | | | | | 10 | |
| Cross-copolymer described in a publicly known publication | | parts by mass | | | | | | | | | 10 |
| Antioxidant | Irg1076 | parts by mass | 0.1 | 0.1 | 0.1 | 0.1 | 0.1 | 0.1 | 0.1 | 0.1 | 0.1 |

In Comparative Example 2, no compatibility accelerator was used. Polypropylene (PP) and polystyrene (PS) are not miscible. Accordingly, a simple composition thereof is fragile, has little elongation in a tensile test, and has a small strength at break. The larger the elongation and the strength at break of a resin composition containing a certain amount of a compatibility accelerator, the better the performance of the compatibility accelerator. When the cross-copolymer as obtained in each Example (Examples 6 to 8) was added as a compatibility accelerator, the elongation and the strength at break both increased. The toughness of the resulting compatibilized resin composition can be evaluated using a simple index: the elongation times the strength at break. The higher this index, the tougher the resin composition. The performance as a compatibility accelerator is represented by this index, and is better than that of the cross-copolymer (obtained in Comparative Example 1) with a low content of olefin of the main chain (for Comparative Example 3), and SEBS and SEPS (for Comparative Examples 4 and 5) used for such a conventional application. Neither an olefin-based 2: Storage modulus curve with respect to the ethylene-vinyl acetate copolymer.
3: Storage modulus curve with respect to the ethylene-octene copolymer.
i: Tan δ curve with respect to the cross-copolymer obtained in Example 1.
ii: Tan δ curve with respect to the cross-copolymer obtained in Example 2.
iii: Tan δ curve with respect to the cross-copolymer obtained in Example 3.
iv: Tan δ curve with respect to the cross-copolymer obtained in Example 4.
v: Tan δ curve with respect to the cross-copolymer obtained in Example 5.
vi: Tan δ curve with respect to the cross-copolymer obtained in accordance with the international publication WO2007139116 (the main chain: ethylene-styrene-divinylbenzene, the content of the main chain styrene was 24 mol %; the crossing chain: polystyrene, the content of polystyrene was 26 mass %; the MFR was 23 g/10 min at 200° C. with a loading of 98 N).

vii: Tan δ curve with respect to the hydrogenated block copolymer SEPS (Septon 2007, manufactured by KURARAY CO., LTD.).

viii: Tan δ curve with respect to the hydrogenated block copolymer SEBS (Toughtek H-1053, manufactured by Asahi Kasei Corporation).

The invention claimed is:

1. A cross-copolymer produced by a polymerization process comprising a coordination polymerization step and a crossing step, wherein the coordination polymerization step comprises copolymerizing an ethylene monomer, a C3-12 olefin monomer, and an aromatic polyene together using a single site coordination polymerization catalyst to synthesize an ethylene-olefin-aromatic polyene copolymer, and the crossing step comprises carrying out a polymerization of a two-reactant mixture having the ethylene-olefin-aromatic polyene copolymer and an aromatic vinyl compound monomer using an anionic polymerization initiator or a radical polymerization initiator, and wherein all the following conditions are met:
   (1) with respect to a composition of the ethylene-olefin-aromatic polyene copolymer obtained in the coordination polymerization step, content of olefin is from 10 mol % to 50 mol %, content of aromatic polyene is from 0.01 mol % to 0.3 mol %, and the remainder equals content of ethylene;
   (2) an weight-average molecular weight of the ethylene-olefin-aromatic polyene copolymer obtained in the coordination polymerization step is from 100,000 to 400,000;
   (3) a mass ratio of the ethylene-olefin-aromatic polyene copolymer obtained in the coordination polymerization step to the cross-copolymer obtained in the crossing step is from 50 to 90 mass %; and
   (4) a total amount of heat of crystal fusion as observed in a temperature range of 40 to 140° C. when the cross-copolymer is determined by DSC is 50 J/g or less.

2. The cross-copolymer according to claim 1, wherein JIS-A hardness thereof is 85 or less or a modulus of elongation thereof is 50 MPa or less.

3. The cross-copolymer according to claim 1, wherein elongation at break thereof is shown to be 300% or more in a tensile test.

4. The cross-copolymer according to claim 1, wherein a storage modulus obtained in a viscoelasticity measurement thereof is 1×105 Pa or more at 140° C.

5. The cross-copolymer according to claim 1, wherein a storage modulus obtained in a viscoelasticity measurement thereof is 1×109 Pa or less at −40° C.

6. The cross-copolymer according to claim 1, wherein the content of olefin in the ethylene-olefin-aromatic polyene copolymer obtained in the coordination polymerization step is from 10 mol % to 20 mol %; and wherein the mass ratio of the ethylene-olefin-aromatic polyene copolymer obtained in the coordination polymerization step to the cross-copolymer obtained after the crossing step is from 60 to 90 mass %.

7. The cross-copolymer according to claim 6, wherein a δL value obtained in a viscoelasticity measurement thereof is 20% or less at 140° C.

8. The cross-copolymer according to claim 6, wherein a heat distortion temperature thereof is 140° C. or more.

9. The cross-copolymer according to claim 6, wherein strength at break thereof is 12 MPa or more and elongation at break thereof is 300% or more in a tensile test.

10. The cross-copolymer according to claim 1, wherein the olefin monomer is at least one compound selected from 1-butene, 1-hexene, and 1-octene.

11. The cross-copolymer according to claim 1, wherein a transition metal compound used as the single site coordination polymerization catalyst is a transition metal compound selected from transition metal compounds represented by the following general formulae (1), (2), and (3):

[Chemical Formula 1]

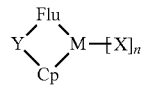

(1)

wherein Flu represents a fluorenyl group or a substituted fluorenyl group and Cp represents a cyclopentadienyl group or a substituted cyclopentadienyl group,
Y is a substituted methylene group having bonds to Flu and Cp and a substituent of the methylene group is hydrogen or a C1-10 hydrocarbon group,
M is a metal selected from zirconium, hafnium, and titanium,
X is a halogen, a C1-15 hydrocarbon group, a C1-15 alkoxide group, a C1-15 amide group, or a C3-15 alkylsilane group,
n is an integer of 1 or 2, and
provided that there are a plurality of Xs, the plurality of Xs may be bonded to each other;

[Chemical Formula 2]

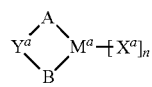

(2)

wherein A and B, each independently, represent a group selected from a benzoindenyl group, a substituted benzoindenyl group, an indenyl group, and a substituted indenyl group,
Ya is a substituted boron group that has bonds to A and B and has, as a substituent, hydrogen or a C1-20 hydrocarbon group,
the substituent of Ya may contains 1 to 3 nitrogen, boron, silicon, phosphorus, selenium, oxygen, or sulfur atoms,
the substituent may have a ring structure,
Xa each independently represents hydrogen, a halogen, a C1-15 alkyl group, a C3-15 alkenyl group, a C6-10 aryl group, a C8-12 alkylaryl group, a silyl group having a C1-4 hydrocarbon substituent, a C1-10 alkoxy group, or an amide or amino group having hydrogen or a C1-22 hydrocarbon substituent,
n is an integer of 1 or 2,
provided that there are a plurality of Xas, the plurality of Xas may be bonded to each other, and
Ma is zirconium, hafnium, or titanium; and

[Chemical Formula 3]

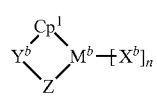

(3)

wherein Cp$^1$ is a group selected from an unsubstituted or substituted cyclopentaphenanthryl group, an unsubstituted or substituted benzoindenyl group, an unsubstituted or substituted cyclopentadienyl group, an unsubstituted or substituted indenyl group, and an unsubstituted or substituted fluorenyl group, where the substituted cyclopentaphenanthryl group, substituted benzoindenyl group, substituted cyclopentadienyl group, substituted indenyl group, or substituted fluorenyl group refers to a cyclopentaphenanthryl group, benzoindenyl group, cyclopentadienyl group, indenyl group, or fluorenyl group in which at least one substitutable hydrogen is substituted by a $C_{1-20}$ alkyl group, a $C_{6-10}$ aryl group, a $C_{7-20}$ alkylaryl group, a halogen atom, an $OSiR_3$ group, an $SiR_3$ group, or a $PR_2$ group (where any R represents a $C_{1-10}$ hydrocarbon group), Y$^b$ has bonds to Cp$^1$ and Z and represents a hydrogen- or $C_{1-15}$ hydrocarbon group-containing methylene group, a silylene group, an ethylene group, a germirene group, or a boron group, the substituents may each be the same or different, Y$^b$ may have a ring structure, Z contains a nitrogen atom, an oxygen atom, or a sulfur atom, has a bond to Y$^b$ via a ligand coordinated to M$^b$ with the nitrogen, oxygen, or sulfur atom, and is a group having hydrogen or a $C_{1-15}$ substituent, M$^b$ is zirconium, hafnium, or titanium, X$^b$ represents hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamide group having a $C^{1-6}$ alkyl substituent, and n is an integer of 1 or 2.

12. A resin composition comprising a polyolefin resin, an aromatic resin, and the cross-copolymer according to claim 1.

13. A resin composition comprising a polyolefin resin and the cross-copolymer according to claim 1.

14. A resin composition comprising an aromatic resin and the cross-copolymer according to claim 1.

15. A cross-copolymer produced by a polymerization process comprising a coordination polymerization step and a crossing step, wherein the coordination polymerization step comprises copolymerizing an ethylene monomer, a C3-12 olefin monomer, and an aromatic polyene together using a single site coordination polymerization catalyst to synthesize an ethylene-olefin-aromatic polyene copolymer, and the crossing step comprises carrying out a polymerization of a two-reactant mixture having the ethylene-olefin-aromatic polyene copolymer and a styrene monomer using an anionic polymerization initiator or a radical polymerization initiator, and wherein a glass transition temperature, which occurs due to a polystyrene chain, as determined using a temperature corresponding to a peak of tan δ obtained through a viscoelasticity measurement is from 105° C. to 145° C.

16. The cross-copolymer according to claim 15, wherein all the following conditions are met:
   (1) with respect to a composition of the ethylene-olefin-aromatic polyene copolymer obtained in the coordination polymerization step, content of olefin is from 10 mol % to 50 mol %, content of aromatic polyene is from 0.01 mol % to 0.3 mol %, and the remainder equals content of ethylene;
   (2) an weight-average molecular weight of the ethylene-olefin-aromatic polyene copolymer obtained in the coordination polymerization step is from 100,000 to 400,000;
   (3) a mass ratio of the ethylene-olefin-aromatic polyene copolymer obtained in the coordination polymerization step to the cross-copolymer obtained in the crossing step is from 50 to 90 mass %; and
   (4) a total amount of heat of crystal fusion as observed in a temperature range of 40 to 140° C. when the cross-copolymer is determined by DSC is 50 J/g or less.

17. The cross-copolymer according to claim 16, wherein the content of olefin in the ethylene-olefin-aromatic polyene copolymer obtained in the coordination polymerization step is from 10 mol % to 20 mol %; and wherein the mass ratio of the ethylene-olefin-aromatic polyene copolymer obtained in the coordination polymerization step to the cross-copolymer obtained after the crossing step is from 60 to 90 mass %.

* * * * *